I. HILB.
DUMPING WAGON.
APPLICATION FILED MAR. 7, 1913.
1,136,800.
Patented Apr. 20, 1915.
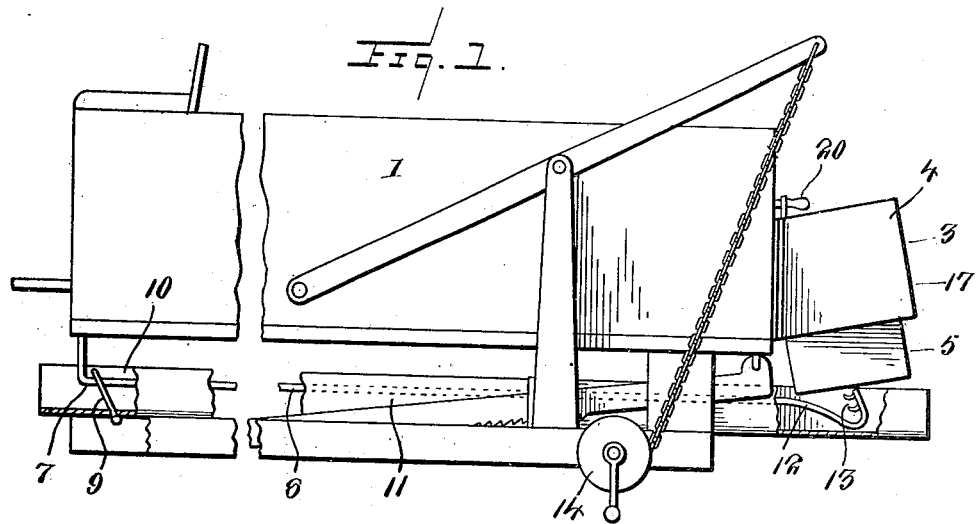
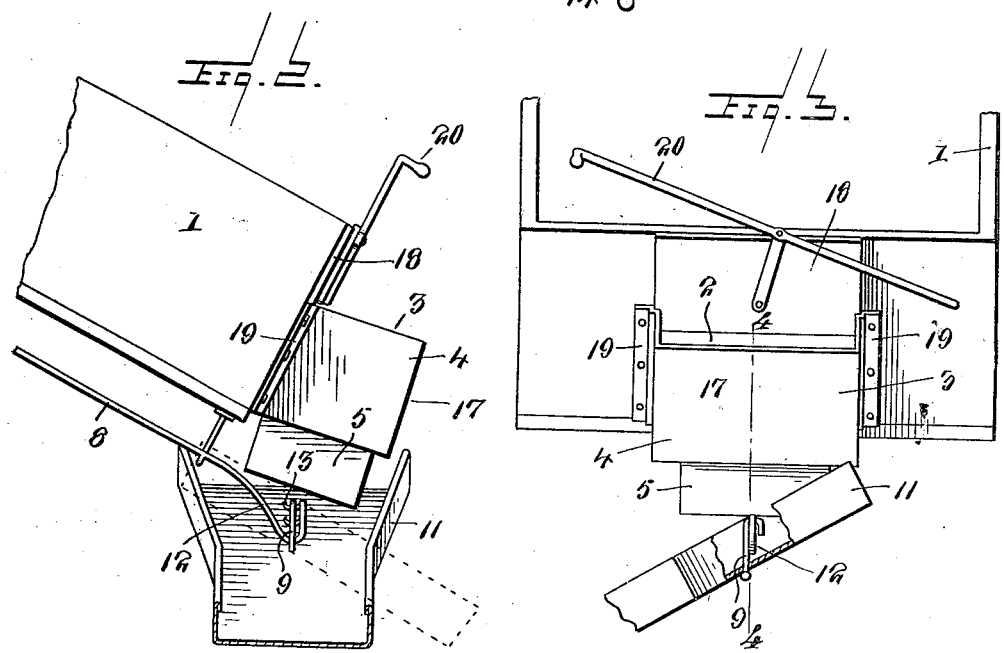
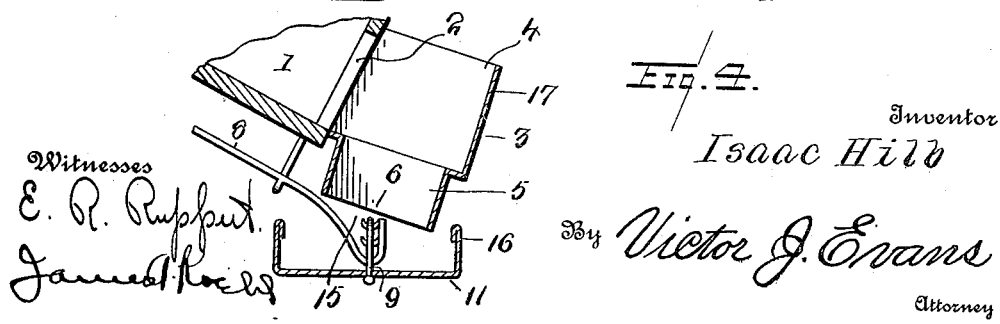
Inventor
Isaac Hilb
By Victor J. Evans
Attorney
Witnesses
E. R. Ruppert
James Roach

UNITED STATES PATENT OFFICE.

ISAAC HILB, OF BALTIMORE, MARYLAND.

DUMPING-WAGON.

1,136,800.  Specification of Letters Patent.  Patented Apr. 20, 1915.

Application filed March 7, 1913. Serial No. 752,791.

*To all whom it may concern:*

Be it known that I, ISAAC HILB, a citizen of the United States, residing at Baltimore city, State of Maryland, have invented new and useful Improvements in Dumping-Wagons, of which the following is a specification.

This invention relates to dumping wagons, and particularly to a discharge hopper and chute therefor; the object of the invention being to provide a hopper which will be located directly at the discharge end of the wagon body and which will be arranged thereon at a fixed angle and associated with the chute so as to obstruct the passage of material in the course of discharge of the latter into the chute and to positively prevent the material from working over one side of the chute during its course of delivery.

Another object of the invention is the provision of a dumping wagon wherein the hopper at the end thereof will be arranged at a fixed angle and associated with such relation to an adjacent portion of the delivering chute as will define therewith and between the chute and the hopper a passage of a gradually restricted height toward one side of the chute so as to permit the material to become slightly congested at one side and at the same time permit of a free flow of the material at the other side.

A still further object of the invention is the provision of a chute which may be adjusted so as to lie at right angles to the longitudinal plane of the wagon and thereby eliminate the necessity of having to turn the wagon at right angles to the roadway.

With these and other objects in view, the invention consists of certain novel features of construction, combination and arrangement of parts, as will be hereinafter described and claimed.

In the accompanying drawings:—Figure 1 is a side view of a portion of a dumping wagon shown conventionally and illustrating the application of the chute and the hopper thereto; Fig. 2 is a side view, showing the body of the wagon in dumping position; Fig. 3 is an end view thereof; and Fig. 4 is a section on line 4—4 of Fig. 3.

The dumping wagon 1 conventionally illustrated herein is provided at its tail or discharge end with an opening 2, to which is fitted a hopper 3 having a relatively large upper portion 4 and a restricted lower portion 5, the former having three walls and arranged in open communication with the opening 2. The reduced portion or discharge end 5 is preferably of rectangular configuration, and it is provided with an open bottom 6. The open bottom 6 of the portion 5 may be parallel with the top of the portion 4 but it is to be distinctly understood that the hopper as a whole is arranged at a fixed angle with relation to the tail end of the wagon body, the hopper being extended upwardly and rearwardly from said tail end, as clearly shown in Fig. 1, for a purpose to be hereinafter explained.

The wagon body is provided with a rail or track 7 having a main chute supporting portion 8 which underlies the bottom of the body 1 and which is adapted to slidably support a bail 9 on one section 10 of a chute structure 11. This rail is provided with a rear end 12 which directly underlies the discharge end of the portion 5 of the hopper 3, being provided with a series of superimposed supporting hooks or equivalent devices or means 13 which are adapted to interchangeably receive the bail 9 when the chute is adjusted to an operative delivering position beneath the hopper. Hence, the chute is slidably supported upon the said rail and is adjustable angularly in horizontal and vertical directions as may be required to enable the material discharged from the hopper to be delivered at the desired point.

Hoisting or raising mechanism 14 is employed for tilting the body 1 upon the bed of the wagon and for causing the normally upwardly and rearwardly inclined hopper to assume a reversed angle of inclination and extend forwardly and upwardly as shown in Fig. 4. Now it is evident from this formation of the hopper the lower discharge end or portion 5 thereof will assume the angle shown in Fig. 2 when the chute is extended to a discharge position at right angles to the longitudinal plane of the wagon and thereby cause the formation of a space 15 between the portion 5 and the adjacent surface of the chute. This formation and relative arrangement of parts causes the space 15 to assume a substantially restricted height in the direction of the side wall 16 of the chute structure and to cause the material to become slightly congested at the restricted portion and positively prevent the material from being scattered over the sides of the chute at the point of immediate discharge between the hopper and the chute as will be understood. The wall 17 of the hopper section 4 forms an obstruction to the passage of the material as it leaves the opening 2, permitting the material to consequently accumulate within the hopper and then gravitationally flow therefrom and into the point of maximum height of the space 15 between the chute and the adjacent hopper portion 5.

The opening 2 of the body 1 may be closed by a vertically sliding gate 18 which is slidable in guides 19 and adapted to be adjusted in the latter through the medium of a controlling lever 20 of any suitable well known character. This construction is also desirable in that the flow of the material may be regulated to suit the occasion.

The device as constructed is such that the chute may be arranged at right angles to the plane of the body 1 so as to minimize the space required to effect a proper conveyance of the material from the wagon to an adjacent point and without requiring the operator to turn the vehicle where it would ordinarily extend across the roadway and in the direct passage of traffic.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as claimed.

Having thus described my invention, what I claim is:—

A dumping wagon having its body provided with a discharge opening at the rear end, a hopper secured to the rear end of the body, a rail extending longitudinally of the body, underlying the same and having its outer end arranged under the hopper and provided with a vertical series of hooks, and a chute slidably supported upon the said rail, adjustable angularly in horizontal and vertical directions and provided with means for interchangeable connection with the hooks of said rail.

In testimony whereof I affix my signature in presence of two witnesses.

ISAAC HILB.

Witnesses:
JAMES A. KOEHL,
BENNETT S. JONES.

Copies of this patent may be obtained for five cents each, by addressing the "Commissioner of Patents, Washington, D. C."